United States Patent
Roesch et al.

(10) Patent No.: US 6,872,884 B2
(45) Date of Patent: Mar. 29, 2005

(54) GANGABLE ELECTRICAL UNIT

(75) Inventors: Mark A. Roesch, Brecksville, OH (US); Dennis P. Revlock, Sr., Medina, OH (US)

(73) Assignee: The Lamson & Sessions Co., Cleveland, OH (US)

( * ) Notice: Subject to any disclaimer, the term of this patent is extended or adjusted under 35 U.S.C. 154(b) by 0 days.

(21) Appl. No.: 10/725,987

(22) Filed: Dec. 2, 2003

(65) Prior Publication Data

US 2004/0074659 A1 Apr. 22, 2004

Related U.S. Application Data

(63) Continuation of application No. 09/992,655, filed on Nov. 13, 2001.
(60) Provisional application No. 60/317,304, filed on Sep. 5, 2001.

(51) Int. Cl.$^7$ ................................................ H02G 3/08
(52) U.S. Cl. ........................... 174/50; 174/53; 174/58; 220/3.2; 220/3.3
(58) Field of Search ........................... 174/50, 53, 54, 174/57, 61, 62, 63, 48, 49, 58, 17 R; 220/3.2, 3.6, 3.9, 4.02, 3.8, 3.7, 3.3, 3.4; 248/906, 200; 439/535, 538; D13/152

(56) References Cited

U.S. PATENT DOCUMENTS

| | | | | |
|---|---|---|---|---|
| 1,206,431 A | 11/1916 | Graybill | ..................... | 220/3.4 |
| 1,818,317 A | 8/1931 | Gilmore | | |
| 1,929,844 A | * 10/1933 | Haas | ........................... | 220/3.9 |
| 2,644,600 A | 7/1953 | Senif | ........................... | 220/3.9 |
| 3,040,926 A | 6/1962 | Palmer | ........................ | 220/3.9 |
| 3,601,276 A | 8/1971 | Culpepper | ................. | 220/3.8 |
| 3,676,571 A | 7/1972 | Rubinstein | .................. | 174/65 |
| 3,701,451 A | 10/1972 | Schindler et al. | ............. | 220/27 |
| 3,724,795 A | 4/1973 | Callanan | ..................... | 248/360 |
| 3,862,351 A | 1/1975 | Schindler et al. | ............. | 174/58 |
| 3,863,021 A | 1/1975 | Schindler et al. | ............. | 174/53 |
| 3,863,037 A | 1/1975 | Schindler et al. | ............. | 174/58 |
| RE28,489 E | 7/1975 | Schindler et al. | ............. | 174/58 |
| 3,917,101 A | 11/1975 | Ware | ........................ | 220/3.2 |
| 4,135,337 A | 1/1979 | Medlin | ........................ | 52/221 |
| 4,140,293 A | 2/1979 | Hansen | ..................... | 248/170.2 |
| 4,165,443 A | 8/1979 | Figart et al. | .................. | 174/53 |
| 4,214,668 A | 7/1980 | Neff et al. | ..................... | 174/50 |
| 4,335,271 A | 6/1982 | Haslbeck | ................... | 174/65 R |
| 4,348,547 A | 9/1982 | Bowden, Jr. | ............. | 174/65 R |
| 4,428,492 A | * 1/1984 | Jorgensen | .................... | 174/53 |
| 4,447,030 A | 5/1984 | Nattel | ........................ | 248/27.1 |
| 4,483,453 A | 11/1984 | Smolik | ........................ | 174/58 |
| 4,497,416 A | 2/1985 | Smolik | ........................ | 220/3.5 |
| 4,533,060 A | 8/1985 | Medlin | ........................ | 220/3.9 |
| 4,569,458 A | 2/1986 | Horsley | ........................ | 220/3.6 |
| 4,572,391 A | 2/1986 | Medlin | ........................ | 220/3.9 |
| 4,612,412 A | 9/1986 | Johnston | ................... | 174/65 R |

(Continued)

OTHER PUBLICATIONS

Carlon catalog entitled "Carlon Zip Box Blue Nonmetallic Outlet and Switch Boxes," Jul., 2003, 20 pp.

Article from Electrical Product News entitled "New Union Dual Voltage Nonmetallic Box Introduced by Thomas & Betts"; Feb., 2001, p. 7.

*Primary Examiner*—Dean A. Reichard
*Assistant Examiner*—Angel R. Estrada
(74) *Attorney, Agent, or Firm*—Jones Day (57) ABSTRACT

A gangable electrical unit for positioning an electrical component beside an electrical outlet box includes a bracket with a wall structure and an adhering element for mounting the wall structure of the bracket on a wall of an electrical outlet box. In one embodiment, the adhering element is positioned on an outward facing wall of the bracket. The invention also relates to a ganged electrical outlet box incorporating the gangable electrical unit.

16 Claims, 5 Drawing Sheets

U.S. PATENT DOCUMENTS

| | | | |
|---|---|---|---|
| 4,673,097 A | 6/1987 | Schuldt | 220/3.5 |
| 4,724,281 A | 2/1988 | Nix et al. | 174/53 |
| 4,747,506 A | 5/1988 | Stuchlik, III | 220/3.6 |
| 4,757,158 A | 7/1988 | Lentz | 174/53 |
| 4,794,207 A | 12/1988 | Norberg et al. | 174/48 |
| 4,843,189 A | 6/1989 | Jorgensen et al. | 174/53 |
| 4,844,275 A | 7/1989 | Schnell et al. | 220/3.9 |
| 4,927,039 A | 5/1990 | McNab | 220/3.7 |
| 4,942,071 A * | 7/1990 | Frye | 138/177 |
| 4,964,525 A | 10/1990 | Coffey et al. | 220/3.9 |
| 4,968,855 A | 11/1990 | Le Paillier | 174/48 |
| 5,005,792 A | 4/1991 | Rinderer | 248/205.1 |
| 5,014,043 A | 5/1991 | Lopetrone et al. | 340/664 |
| 5,025,944 A | 6/1991 | Rodick | 220/3.3 |
| 5,064,386 A | 11/1991 | Dale et al. | 439/535 |
| 5,114,365 A | 5/1992 | Thompson et al. | 439/540 |
| 5,125,527 A | 6/1992 | Parlatore et al. | 220/266 |
| 5,243,134 A | 9/1993 | Nattel | 174/53 |
| 5,263,676 A | 11/1993 | Medlin, Jr. et al. | 248/300 |
| 5,287,665 A | 2/1994 | Rath, Jr. | 52/220.8 |
| D345,142 S | 3/1994 | Porter | D13/156 |
| 5,289,934 A | 3/1994 | Smith et al. | 220/3.7 |
| 5,301,437 A | 4/1994 | Burke | 33/562 |
| 5,354,953 A | 10/1994 | Nattel et al. | 174/54 |
| 5,357,055 A | 10/1994 | Sireci | 174/48 |
| 5,386,959 A | 2/1995 | Laughlin et al. | 248/205.1 |
| 5,408,045 A | 4/1995 | Jorgensen et al. | 174/58 |
| 5,448,011 A | 9/1995 | Laughlin | 174/48 |
| 5,450,974 A | 9/1995 | Lippa | 220/3.9 |
| 5,486,650 A | 1/1996 | Yetter | 174/53 |
| 5,509,560 A | 4/1996 | Nash | 220/3.9 |
| 5,574,255 A * | 11/1996 | Simmons | 174/53 |
| 5,579,939 A | 12/1996 | Bourassa | 220/3.3 |
| 5,594,207 A | 1/1997 | Fabian et al. | 174/58 |
| 5,595,362 A | 1/1997 | Rinderer et al. | 248/27.1 |
| 5,596,174 A | 1/1997 | Sapienza | 174/57 |
| 5,598,998 A | 2/1997 | Lynn | 248/300 |
| 5,600,093 A | 2/1997 | Herth et al. | 174/53 |
| 5,646,371 A | 7/1997 | Fabian | 174/58 |
| 5,677,512 A | 10/1997 | Reiker | 174/58 |
| 5,710,392 A | 1/1998 | Bordwell et al. | 174/50 |
| 5,717,164 A | 2/1998 | Shetterly | 174/58 |
| 5,744,753 A | 4/1998 | Nattel | 174/58 |
| 5,789,706 A | 8/1998 | Perkins | 174/65 |
| 5,810,303 A | 9/1998 | Bourassa et al. | 248/205.1 |
| 5,833,110 A | 11/1998 | Chandler et al. | 220/3.9 |
| 5,841,068 A | 11/1998 | Umstead et al. | 174/58 |
| D404,715 S | 1/1999 | Almond | D13/152 |
| 5,863,016 A | 1/1999 | Makwinski et al. | 248/27.1 |
| D405,422 S | 2/1999 | Tennefoss et al. | D13/152 |
| 5,883,331 A | 3/1999 | Reiker | 174/54 |
| 5,965,844 A | 10/1999 | Lippa | 174/49 |
| 5,998,732 A | 12/1999 | Caveney et al. | 174/48 |
| D422,266 S | 4/2000 | Roesch | D13/152 |
| 6,051,785 A | 4/2000 | Baldwin et al. | 174/54 |
| 6,057,509 A | 5/2000 | Simmons | 174/53 |
| D427,889 S * | 7/2000 | Gretz | D8/354 |
| 6,091,023 A | 7/2000 | O'Donnell | 174/57 |
| 6,093,890 A | 7/2000 | Gretz | 174/58 |
| 6,103,974 A | 8/2000 | Erdfarb | 174/66 |
| 6,108,331 A | 8/2000 | Thompson | 370/352 |
| 6,147,304 A | 11/2000 | Doherty | 174/48 |
| 6,194,657 B1 | 2/2001 | Gretz | 174/53 |
| 6,204,450 B1 | 3/2001 | Reiker | 174/58 |
| 6,207,898 B1 | 3/2001 | Reiker | 174/61 |
| 6,242,696 B1 | 6/2001 | Reiker | 174/62 |
| 6,281,439 B1 | 8/2001 | Reiker | 174/62 |
| 6,300,567 B1 | 10/2001 | Hayduke et al. | 174/58 |
| 6,323,424 B1 | 11/2001 | He | 174/58 |
| 6,376,770 B1 | 4/2002 | Hyde | 174/50 |
| D457,140 S | 5/2002 | Roesch et al. | D13/152 |
| 6,384,336 B1 | 5/2002 | VanderVelde et al. | 174/48 |
| D462,664 S | 9/2002 | Roesch et al. | D13/152 |
| 6,452,098 B1 * | 9/2002 | Gretz | 174/59 |
| 6,484,980 B2 | 11/2002 | Medlin, Sr. et al. | 248/205.1 |
| 6,508,445 B1 * | 1/2003 | Rohmer | 174/58 |
| 6,624,355 B1 | 9/2003 | Gretz | 174/59 |
| 2003/0024725 A1 | 2/2003 | Lalancette et al. | 174/58 |

* cited by examiner

GANGABLE ELECTRICAL UNIT

CROSS-REFERENCE TO RELATED APPLICATION

This application is a continuation of U.S. patent application Ser. No. 09/992,655, filed Nov. 13, 2001, the disclosure of which is incorporated herein by reference, and which claims the benefit of U.S. Provisional Application No. 60/317,304, filed Sep. 5, 2001.

FIELD OF THE INVENTION

The claimed invention relates to electrical equipment. In particular, the invention relates to gangable electrical units which are positioned adjacent other electrical outlet units for the installation of electrical components therein.

BACKGROUND

Electrical outlets for powering electrical equipment are installed in electrical boxes within the walls of structures. Electrical outlets typically have a voltage output of 120 volts, for a standard electrical outlet, but can have higher outputs depending upon the output requirement. Such outlets are typically referred to as high voltage outlets. Electrical codes generally require an enclosed box for high voltage outlets. Standard electrical boxes may be any number of gangs, such as single, double, triple, etc. Electrical boxes are configured for installation to a wall stud during construction or remodeling.

Low voltage outlets have become increasingly necessary for installation in wall structures. Low voltage outlets are used for low voltage communication electrical equipment, such as telephone and cable, among others. Electrical codes generally do not require an enclosed receptacle for low voltage outlets.

It has become commonplace to install electrical outlets in close proximity to cable and phone lines, and often at numerous places within a single room. "Smart" homes often utilize equipment or appliances that require access to both a high voltage outlet and a low voltage outlet.

SUMMARY

The claimed invention is a gangable electrical unit for positioning an electrical component beside an electrical outlet box. The gangable electrical unit includes a bracket and means for mounting the wall structure of the bracket on a wall of an electrical outlet box. The bracket structure includes a wall structure that defines a front opening.

In one embodiment, the gangable electrical unit also includes a stop extending outwardly from the wall structure of the bracket. The stop includes a weakened portion positioned between the stop and the wall structure. The stop is configured to be broken away from the wall structure of the bracket with the application of a force sufficient to break the weakened portion. The weakened portion may include a plurality of perforations.

The wall structure of the bracket may include a top wall, a bottom wall, and an attachment side wall, with corners formed between the top and bottom walls and the attachment side wall. The corners are radiused in order to provide a gap for accepting a fastener head when the wall bracket is coupled to an electrical outlet box.

In another embodiment, the means for mounting the wall structure of the bracket on a wall of an electrical outlet box includes a clip. The clip is extends outwardly from the wall structure of the bracket. The clip is configured to engage a wall of an electrical outlet box. The clip may be configured to wrap around and grasp a front edge of a wall of an electrical outlet box. The clip may be resilient. In addition, two clips may be provided that are spaced apart from one another.

The clip may be L-shaped, with a first leg of the L-shaped clip being attached to the wall structure of the bracket and extending perpendicularly away from the wall structure. The second leg of the L-shaped clip extends perpendicularly away from the first leg of the clip. This second leg is configured to engage an inner surface of a wall of an electrical outlet box. The second leg of the L-shaped clip may include a recess positioned at a point along the length of the second leg, and an appendage extends inwardly on one side of the recess at an angle relative to the remainder of the second leg, with the recess acting as a hinge. The appendage is configured for resiliently abutting an inner surface of a wall of an electrical outlet box. The second leg may also include a self-centering protrusion for centering the gangable electrical unit on an electrical outlet box unit. The self-centering protrusion is configured to abut a wall of the electrical outlet box unit.

An adhering element may be coupled to the wall structure of the bracket. The adhering element is positioned to adhere the bracket to a wall of an electrical outlet box.

The wall structure of the bracket includes a top wall, a bottom wall, an attachment side wall, and an open back. The clips and the adhering element are associated with the attachment side wall and together adjoin the bracket to an electrical outlet box.

In another embodiment, the means for mounting the wall structure of the bracket on a wall of an electrical outlet box includes an adhering element associated with the wall structure of the bracket on an outer surface thereof. The adhering element is positioned to engage a wall of an electrical outlet box.

The wall structure of the bracket may include a top wall, a bottom wall, an attachment side wall, and an open back, with the adhering element being attached to the attachment side wall. Alternatively, the wall structure of the bracket may include three walls that partially surround the front opening. One of the walls of the bracket may be a partial side wall. The partial side wall has a front edge that is spaced from the front opening to define an opening in the partial side wall. The adhering element may be positioned on the partial side wall. Further, the wall structure of the bracket may include a partial side wall, only a portion of which extends to the front opening. A pair of clips may extend outwardly from the front opening of the bracket from the partial side wall. The clips may be configured to engage a wall structure of an electrical outlet box.

In another embodiment of the claimed invention, a gangable electrical unit is provided for positioning an electrical component beside an electrical outlet box. The gangable electrical unit includes a bracket having a wall structure that defines a front opening, and a clip. The clip is associated with the wall structure and extends outwardly from the wall structure of the bracket. The clip is configured to engage a wall of an electrical outlet box.

The clip may include a self-centering portion for centering the bracket on an electrical outlet box. The self-centering portion is a protrusion that extends from the clip. The protrusion is configured to abut a wall of an electrical outlet box.

A stop may extend outwardly from the wall structure of the bracket. The stop includes a weakened portion positioned between the stop and the wall structure. The top is configured to be broken away from the wall structure with the application of a force sufficient to break the weakened portion.

In a further embodiment, a gangable electrical unit is provided for positioning an electrical component beside an electrical outlet box. The unit includes a bracket having a wall structure that defines a front opening, and an adhering element. The adhering element is attached to the wall structure of the bracket and positioned for adhering the bracket to a wall of an electrical outlet box.

The gangable electrical unit may also include a stop extending outwardly from the wall structure of the bracket. The stop includes a weakened portion positioned between the stop and the wall structure. The stop is configured to be broken away from the wall structure with the application of a force sufficient to break the weakened portion.

An alternative embodiment is a ganged electrical outlet box assembly that includes a gangable electrical unit having a clip and an electrical outlet box. The electrical outlet box has a wall for contacting the gangable electrical unit, and the gangable electrical unit is attached to the electrical outlet box by the clip. The electrical outlet box has a wall structure that defines an outer periphery. When the electrical outlet box is adjoined to the gangable electrical unit, the ganged assembly has a continuous, rectangular outer periphery at the front openings. In addition, an adhering element is positioned on the wall structure of the ganged electrical unit and positioned to engage the wall of the electrical outlet box.

Another embodiment of the invention is a ganged electrical outlet box assembly that includes a gangable electrical unit having an adhering element and an electrical outlet box. The electrical outlet box has a four-sided wall structure that defines a front opening. The electrical outlet box wall structure has an outer periphery and an interior. The interior is for receiving an electrical component, with the gangable electrical unit being attached to the electrical outlet box by the adhering element. The adhering element may be an adhesive, a double-sided adhesive tape, a putty, or a hook and loop tape.

An alternative embodiment of the claimed invention is an apparatus that includes a bracket structure having a three-sided front edge, a routing portion, and a clip portion. The routing portion is configured to route a low voltage electrical line. The clip portion is configured to engage a high voltage electrical box to support the bracket structure in a position in which the electrical box and three-sided front edge together define a four-sided opening for access to a low voltage electrical line at the routing portion.

The front edge, routing portion, and clip portion of the bracket structure are portions of a one-piece plastic part.

The clip portion of the bracket structure may include a pair of clips that are located at opposite ends of the three-sided front edge. The clip portion is configured to deflect elastically into a stressed condition upon movement into engagement with the electrical box. The clip portion can exert a spring force that restrains movement of the bracket structure out of position.

The bracket structure has a top wall, a bottom wall, and a free side wall which together define three sides of the bracket structure that extend rearwardly from the front edge. In addition, the bracket structure includes an attachment side wall that defines a fourth side of the bracket structure with a front edge. Part of the front edge is spaced rearwardly from the three-sided front edge. The attachment side wall may be configured to overlie an adjacent side wall of the electrical box when the bracket structure is in position.

The bracket structure may also include an adhesive element positioned on the attachment side wall. The attachment side wall can be adhesively attached to the side wall of the electrical box. The apparatus may also include a low voltage electrical line routed by said routing portion of the bracket structure and a high voltage electrical box upon which the bracket structure is supported in position by the clip portion. The routing portion may define a first size hole and include a break-away portion defining a second size hole that is larger than the first size hole. The break-away portion may be broken away to define the second size hole.

In yet another embodiment, an electrical unit is provided for coupling to a stud. The electrical unit includes a bracket having a wall structure that defines a front opening. A mounting member is coupled to the wall structure for mounting the wall structure to a stud. A stop is coupled to the wall structure of the bracket along a weakened portion that is positioned between the stop and the wall structure. The stop is configured to be broken away from the wall structure of the bracket with the application of a force sufficient to break the weakened portion.

DETAILED DESCRIPTION

Figure 8:
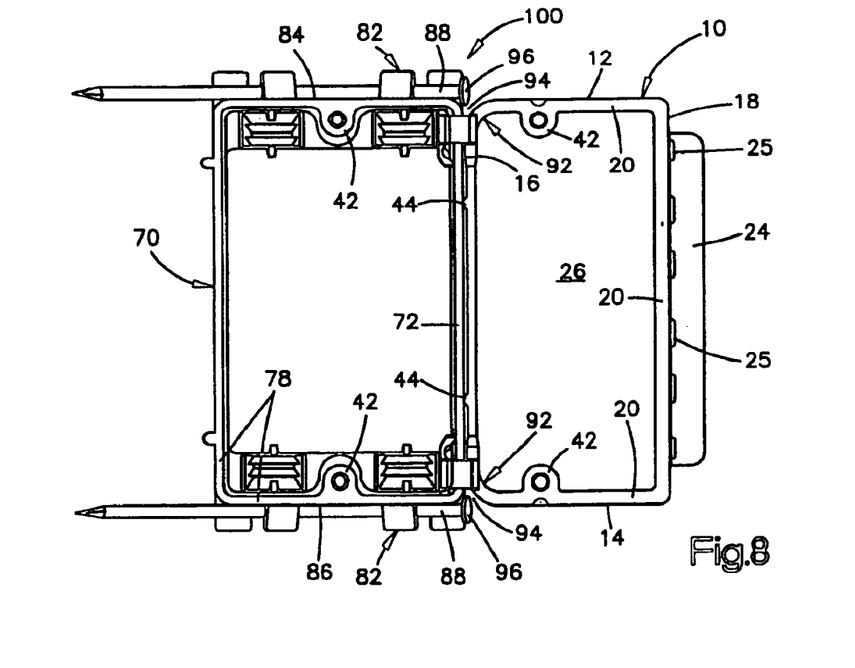
FIG. 8 is a front view of a ganged electrical outlet box showing the gangable electrical unit positioned adjacent an electrical outlet box.

A gangable electrical unit 10, or add-on unit, is shown alone in FIGS. 1–6 and in conjunction with an electrical outlet box 70 in FIG. 8. The gangable unit 10 is used to gang an additional electrical unit 10 to another electrical unit 70 in order to create additional receptacles in the same general location. The gangable unit 10 may be attached to any type of electrical unit, including a single gang electrical box (as shown in FIG. 8), a double gang electrical box, a dual voltage electrical box, or other types of electrical units.

A single gangable unit 10 is shown joined to a single gang electrical unit in FIG. 8 to form a ganged electrical unit 100. Additional gangable units may also be joined to the gangable unit 10 in order to form multiple ganged assemblies. For instance, in FIG. 8, an additional gangable unit may be added to the free side of the gangable unit 10. The gangable unit 10 is preferably configured such that when it is adjoined to another unit, a standard gang unit is created. For instance, if a single gang gangable unit 10 is attached to a single gang electrical unit 70, the combination will form a double gang unit which may be covered by a standard double gang wall plate. In addition, while the gangable unit 10 is depicted herein as a single gang, it may be other size gangs.

Figure 1:
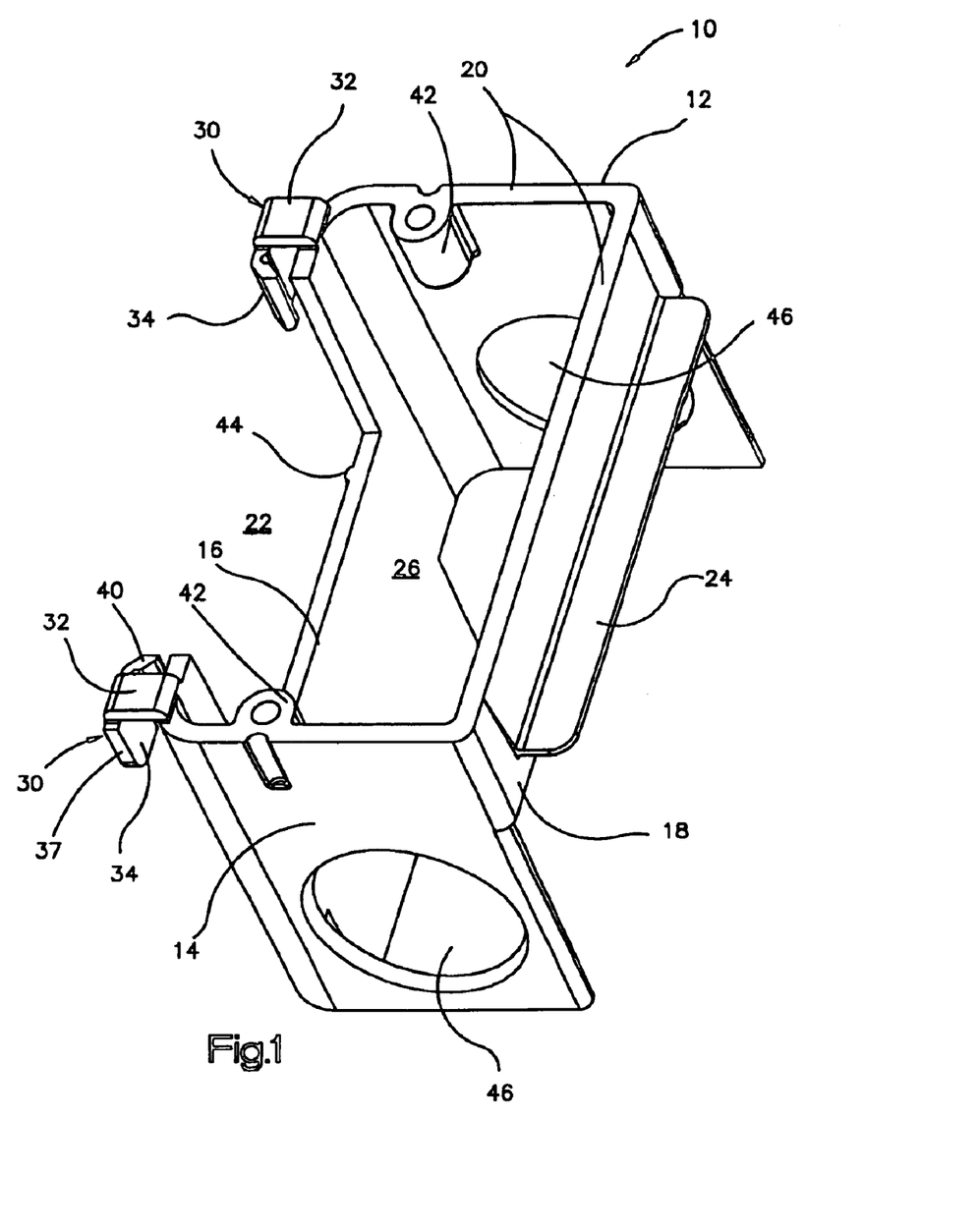
FIG. 1 is a front perspective view of an embodiment of the gangable electrical unit of the claimed invention.

Referring to FIG. 1, the gangable electrical unit 10 is a bracket. The bracket has a substantially rectangular opening defining four walls, including a top wall 12, a bottom wall 14, an attachment side wall 16, and a free side wall 18. The top wall 12, bottom wall 14, and free side wall 18 each have front edges which define the front face 20 of the gangable unit 10. A part of the attachment side wall 16 does not extend to the front face 20 and is, instead, spaced from the front face 20 to define an opening 22 on the attachment side wall 16. The opening is positioned in the attachment side wall 16 such that only part of the attachment side wall 16 extends to the front face 20. In an alternative embodiment (not shown), the attachment side wall may entirely extend to the front face.

Figure 2:
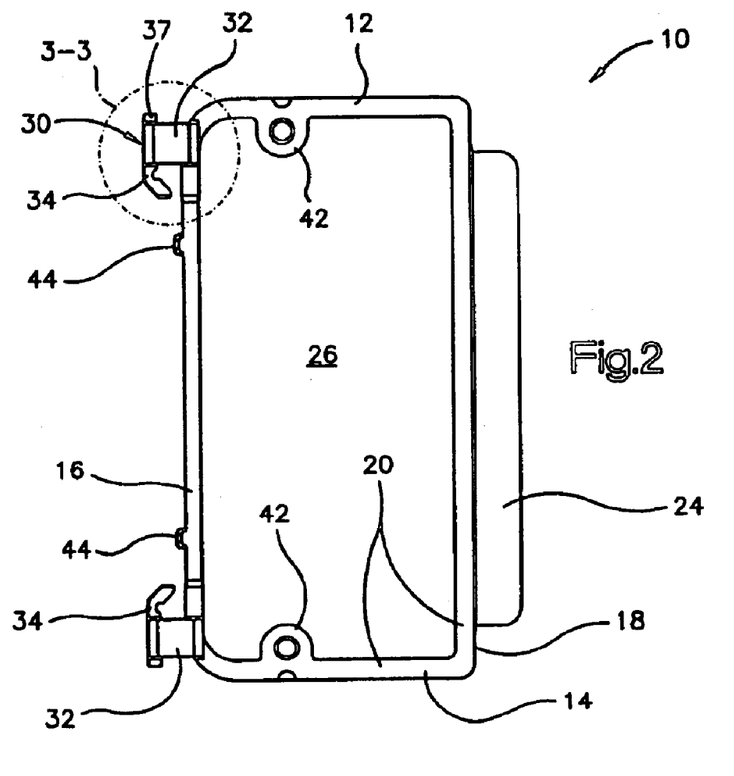
FIG. 2 is a front view of the unit shown in FIG. 1.
Figure 3:
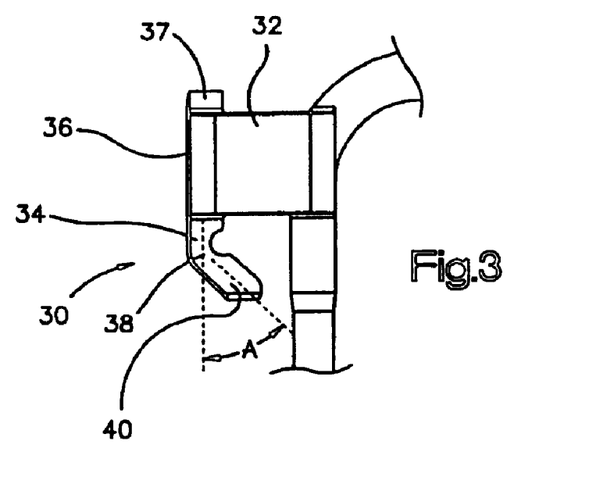
FIG. 3 is an expanded view of the portion 3—3 of FIG. 2 depicting an attachment mechanism utilized to attach the unit to another electrical unit.

As shown in FIGS. 1–3, a pair of clips 30 are attached to the portion of the attachment side wall 16 that extends to the front face 30 and are utilized to attach the gangable unit 10 to another unit 70, such as a low voltage, high voltage (as shown in FIG. 8), or dual voltage unit. The clips 30 are preferably coupled to the attachment side wall 16 adjacent the top 12 and bottom 14 walls and are configured to mate with another electrical unit 70. The clips 30 are configured for stand alone attachment of the gangable unit 10 to the adjoining electrical unit 70. No other attachment mechanisms are needed to firmly engage the gangable unit 10 with the adjoining unit 70. While the clips 30 are shown connected to the attachment side wall 16, they may, alternatively, be attached to the top and bottom walls for engaging another unit 70 that is positioned adjacent the attachment side wall 16.

Figure 4:
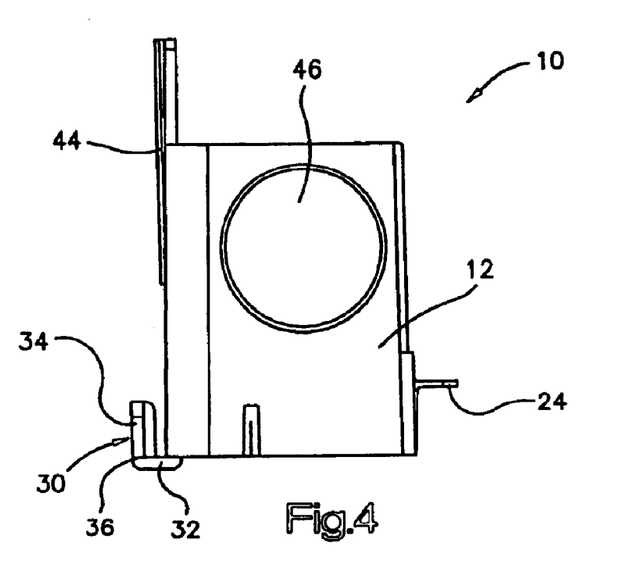
FIG. 4 is a top view of the unit shown in FIG. 1.

Referring to FIGS. 3 and 4, the clips 30 are preferably L-shaped. A first leg of the L 32 extends perpendicular to and outwardly from the attachment side wall 16, parallel to and slightly spaced from the front face 20. The second leg of the L 34 is attached to the outward end 36 of the first leg of the L 32 and extends perpendicularly to the first leg 34 rearwardly and along a plane that is parallel to the attachment side wall 16. The second leg 34 includes an inwardly protruding part 40 and an outwardly protruding part 37. The first and second legs 32, 34 wrap around the side wall 72 of an adjoining electrical unit 70 such that the first leg 32 extends over the front face 78 of the adjoining unit 70 and the second leg 34 abuts an inner surface 76 of the adjoining unit 70.

The second leg 34 of the L-shaped clip 30 includes a recess 38 on the inner surface of the inwardly protruding part or appendage 40. Appendage 40 extends at an angle A relative to the plane of the second leg 34. The recess 38 is positioned at a point along the length of the second leg 34, and the appendage 40 is positioned adjacent the recess 38 at the free end of the second leg. The appendage 40 is angled such that it directly abuts an inner surface 76 of the side wall 72 of an adjoining unit 70 when the gangable unit 10 is positioned adjacent another unit 70. The L-shaped clip 30 is resilient or spring loaded such that it can deform or flex slightly to firmly engage with an internal side wall 72 of an adjoining unit 70. The recess 38 in the second leg 34 defines a hinge for a greater amount of deformation or flex between the main body of the second leg 34 and the appendage 40 of the second leg 34, as shown in FIG. 8 where the clips are deformed to engage the inner walls 72 of the adjoining unit 70.

The outwardly protruding part 37 is configured to abut the top and bottom walls of an adjoining unit. The outwardly protruding part 37 is preferably dimensioned to abut the wall of an adjoining part and may, at times, create an interference fit. An interference fit is possible due to the resiliency of clip 30. Outwardly protruding part 37 provides a self-centering function in that when the gangable electrical unit 10 is joined to an adjoining electrical box 70, such that clips 30 engage a wall of box 70, the outwardly protruding parts 37 either directly or substantially abut the top and bottom walls of adjoining unit. As a result, the gangable electrical unit is inherently centered without the need to manually center the unit 10 on the box 70. While protruding parts 37 are shown in the figures to be rectangular-shaped, they may be other shapes, such as wedge-shaped or triangular. A wedge or triangular shape may add additional resilience to the part to assist in the creation of interference fits, or when the size of the adjoining unit varies.

The first leg 32 of the L-shaped clip 30 is configured so that when the clip 30 wraps around the wall 72 of an adjoining unit 70, as shown in FIG. 8, the underside of leg 32 will abut the front face 78 of the adjoining unit 70. The abutting relationship between the leg 32 and the wall 72 allows the face 20 of the gangable unit 10 to align with the face 78 of the adjoining unit 70. First leg 32 has a thickness that is sufficient to maintain the stability of the clip 30, so that clip 30 may bend or deflect as necessary to grab wall 70. First leg 32 is sufficiently thin, however, to allow a standard cover plate (not shown) to be positioned over the gangable unit 10 and adjoining unit 70. A cover plate may be connected to the units 10, 70 via mounting bosses 42. First leg 32 is sufficiently thin so that it does not interfere with placement of a cover plate over the units 10, 70.

The gangable unit 10 includes a pair of mounting bosses 42 that are connected to the top 12 and bottom 14 walls, respectively. The mounting bosses 42, as shown, extend inwardly into the interior 26 of the gangable unit 10 and are utilized for connecting an electrical component (not shown) to the gangable unit 10. Each mounting boss 42 may extend to the plane of the front face 36 of the bracket 10, as shown in FIG. 1, and preferably extends inwardly from the front face 36 to a distance spaced from the front face 36. Each mounting boss 42 is configured for receiving a fastener, such as a screw (not shown). Other types of mounting bosses may be utilized as known by those of skill in the art. While the mounting bosses 42 are shown extending inwardly, other types of mounting bosses may also be utilized with several embodiments of the invention, including bosses that extend outwardly.

Figure 7:
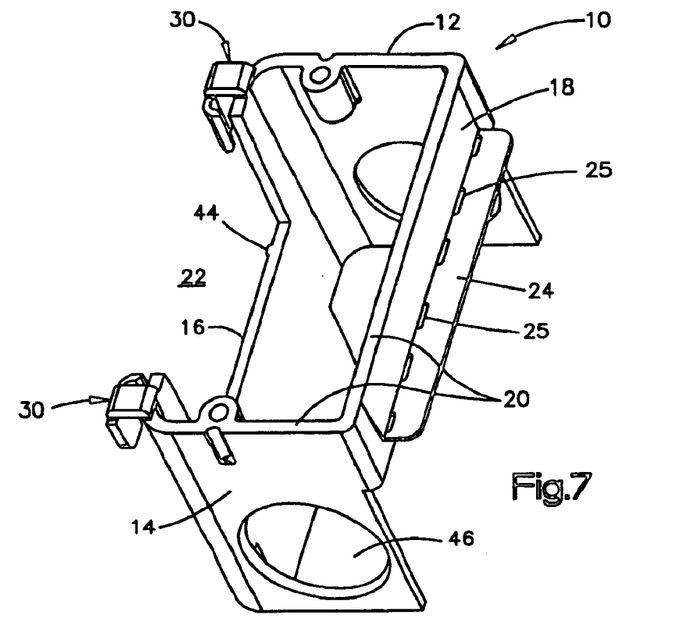
FIG. 7 is a front perspective view of an alternative embodiment of a gangable electrical unit showing a break-away drywall stop.

Referring to FIGS. 1, 2, 4, and 7, a stop or ledge 24 preferably extends outwardly and substantially perpendicularly from the free side wall 18 of the gangable unit 10. The stop 24 is substantially planar and extends along a portion of the length of the free side wall 18. The stop 24 is positioned a distance from the front face 20 of the gangable unit 10 that is equivalent to the thickness of a sheet of drywall or wall board. A sheet of drywall may be positioned over the stop 24 such that the front face 20 of the unit is flush with the outer surface of the sheet of drywall or wall board (not shown). The stop 24 may be configured differently, as known by those of skill in the art, or may be entirely excluded, if so desired. For instance, an alternative embodiment of the drywall stop 24 is shown in FIGS. 7 and 8 as including a plurality of perforations 25. The stop 24 shown in FIGS. 7 and 8 is a breakaway stop because it may be broken away from the remainder of bracket 10 with the application of a sufficient level of force. The perforations 25 are utilized to weaken the connection between the bracket 10 and the stop 24. It may be desirable to break off the stop 24 when the bracket 10 is being inserted into a pre-existing wall, where drywall or other wall board is already installed and an opening has been cut for the bracket 10 and/or another electrical unit 70.

As shown in FIGS. 1, 2, 5, 6, and 8, a pair of ribs 44 extend outwardly and from the exterior surface of the attachment side wall 16 along at least a portion of the length of the attachment side wall 16. The ribs 44 are utilized to position the gangable electrical unit 10 against a side wall 72 of an adjoining electrical unit 70 in square relationship.

Figure 5:
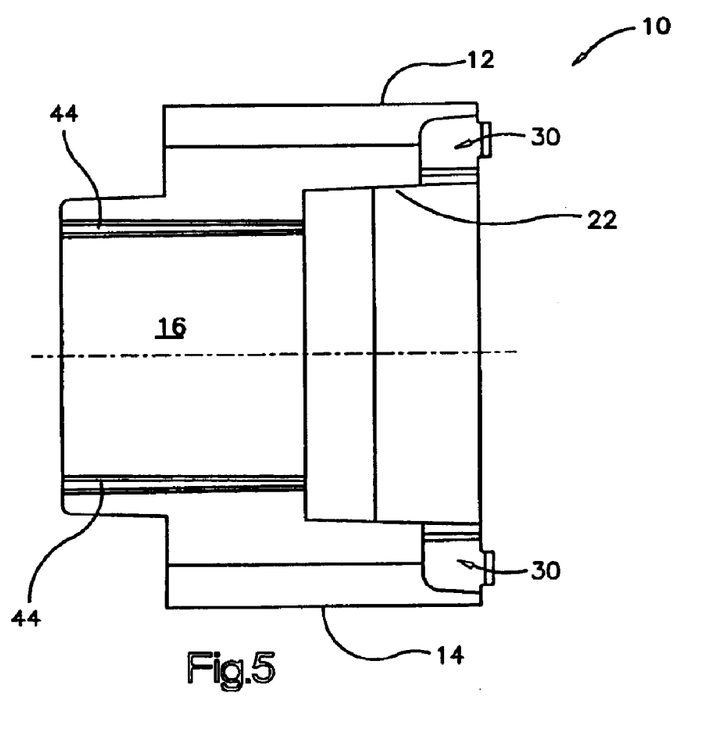
FIG. 5 is a left side view of the unit shown in FIG. 1.

Referring to FIGS. 1 and 5, the top 12 and bottom 14 walls of the gangable unit 10 extend rearwardly. At a position spaced from the front face 20, the top and bottom walls 12, 14 may bend outwardly in a splayed manner. Alternatively, the top and bottom walls 12, 14 are arranged perpendicularly to the front face 20 of the unit 10. The top and bottom walls include a circular opening 46 for connecting to a male electrical non-metallic tubing (ENT) connector (not shown). Alternatively, these circular openings 46 may be used for the direct routing of cable into the interior 26 of the gangable unit 10. While circular openings 46 are shown on the walls 72, other shaped openings may alternatively be utilized. Openings 46 may include knock-out portions, i.e., that break away with the application a sufficient force, around openings 46. In this configuration, a first size opening 46 is formed in the walls and a larger second size opening (not shown) may be formed in the walls by breaking the break away portions. In addition, knock-out panels that break away to reveal an opening may be used instead of preformed openings.

Figure 6:
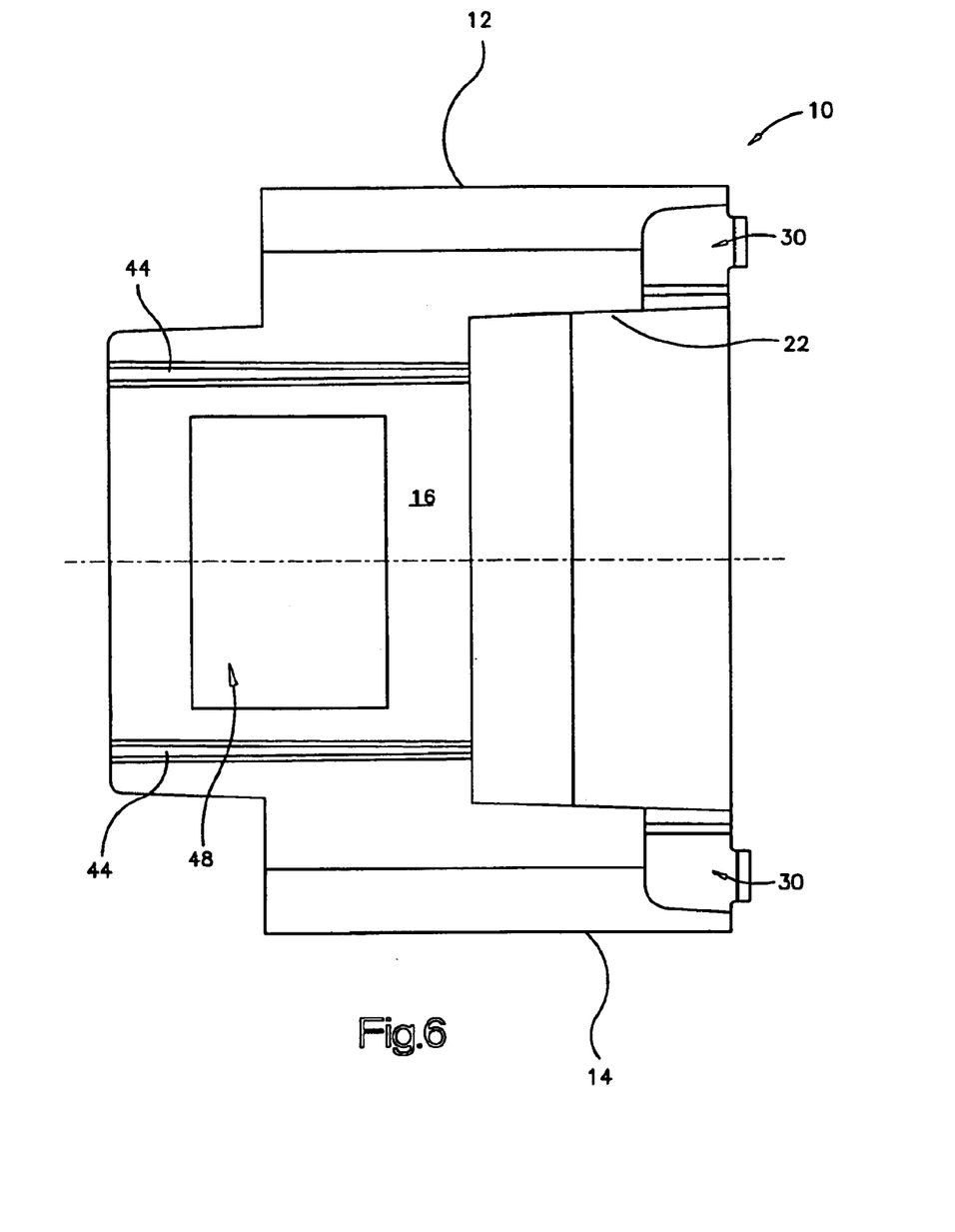
FIG. 6 is a left side view of an alternative embodiment of the unit similar to that shown in FIG. 5 and further including an adhesive strip positioned on a wall of the unit.

An alternative embodiment of the claimed invention is shown in FIG. 6, which shows an adhesive strip 48 positioned on the exterior surface of the attachment side wall 16. The adhesive strip 48 provides stand alone attachment of the gangable unit 10 to an adjoining electrical unit 70. The adhesive strip 48 is preferably configured to mate with an abutting side wall 72 of an adjoining electrical unit 70 to firmly hold the gangable unit 10 to the abutting side wall. The adhesive strip 48 may be used in addition to the clips 30, or may be used instead of the clips 30.

The adhesive strip 48 may be double-sided tape such that one side is adhered to the gangable unit 10 attachment side wall 16 and the other side faces outwardly for engagement with another unit. A protective, removable strip may be applied to the outwardly facing part of the adhesive strip 48. This removable strip may be removed to expose the adhesive surface of the strip 48 for application to an adjoining unit 70. Other types of adhering elements may also be utilized and are believed to be within the scope of the claims, such as glue, spray adhesive, hook and loop (such as Velcro), putty, and other types of adhering elements. When hook and loop materials are utilized, the hook layer is adhered to the gangable unit 10 and the loop layer is applied to the side wall 72 of the electrical unit 70, or vice versa.

Referring to FIG. 8, the gangable unit 10 may be positioned adjacent another electrical outlet box 70, such as the single gang unit shown in FIG. 8. The single gang unit 70 includes one gang into which electrical components, such as electrical receptacles, may be installed. A pair of mounting members 82 are shown attached to the top 84 and bottom 86 walls of the single gang unit 70 and are positioned such that one side of the single gang unit 70 may be attached to a stud. The mounting members 82 include a plurality of channels through which nails 88, screws, or other fasteners may be inserted. The fasteners may then be nailed, screwed, or otherwise attached to the side of a stud to attach the single gang unit 70 to the stud (not shown). Other types of mounting members may also be utilized, as known by those of skill in the art.

The single gang unit 70 includes a free side wall 72, which is not positioned adjacent a stud during installation. As shown in the embodiment of FIG. 8, the gangable electrical unit 10 is positionable adjacent the free side wall 72 of the single gang unit 70 such that the flange or stop 24 on the single gang unit 70 extends into the interior 26 of the gangable unit 10. The flange or stop 24 on the free side wall 72 is utilized for the same purpose as the stop 24 on the gangable unit 10. As is evident, the opening 22 in the attachment side wall 16 must be sufficiently sized to accept the stop 24 of the electrical unit 70, or any other members that extend outwardly from the side wall 72 of the electrical unit 70. The ribs 44 that extend along the length of the attachment side wall 16 abut an exterior surface of free side wall 72 of the adjoining unit 70.

As shown in FIG. 8, the front face 20 of the gangable unit 10 preferably is coplanar with the plane of the front face 78 of the adjoining unit 70. In addition, the shape of the gangable unit 10 is preferably complementary to the shape of the adjoining unit 70 such that when the mounting bosses 42 extend inwardly on both the electrical unit 70 and the gangable unit 10, the exterior wall structure at the front face 20, 78 of the adjoined assemblies defines a continuous, rectangular outer periphery. This continuous, rectangular outer periphery allows the drywall or wall board installer to have a smooth outer edge around which the drywall or wall board may be cut.

Another advantageous feature of the gangable unit 10, shown in FIG. 8, is the provision of a larger radius curve for the corners 92 of the gangable electrical unit 10 on the attachment side wall in the vicinity of the clips 30. This larger radius curve provides a small gap 94 between the gangable electrical unit 10 and the wall 72 of the electrical outlet unit 70.

As shown in FIG. 8, this gap is useful in providing clearance for the head 96 of the nail 44 that is used to attach the electrical outlet unit 70 to a stud.

The gangable unit 10, as shown, is suitable for low voltage applications. Low voltage applications typically involve low voltage communication lines, such as cable and telephone. However, the term low voltage application is meant to encompass other types of low voltage electrical lines and components. While a back wall is not shown on the gangable unit 10, a back wall may be utilized with the bracket if desired for high voltage applications.

In a preferred embodiment, the gangable unit 10 is formed out of molded thermoplastic resin. An example of such a material is PVC. The material out of which the gangable unit 10 is formed preferably allows for some degree of deformation or flex in order to allow the clips on the gangable unit 10 to deform or flex against an adjoining unit. The unit 10 may be manufactured utilizing an injection molding process. Other processes and materials may also be utilized in manufacturing the unit.

While various features of the claimed invention are presented above, it should be understood that the features may be used singly or in any combination thereof. Therefore, the claimed invention is not to be limited to only the specific embodiments depicted herein.

Further, it should be understood that variations and modifications may occur to those skilled in the art to which the claimed invention pertains. The embodiments described herein are exemplary of the claimed invention. The disclosure may enable those skilled in the art to make and use embodiments having alternative elements that likewise correspond to the elements of the invention recited in the claims. The intended scope of the invention may thus include other embodiments that do not differ or that insubstantially differ from the literal language of the claims. The scope of the present invention is accordingly defined as set forth in the appended claims.

What is claimed is:

1. A gangable electrical unit for positioning an electrical component beside an electrical outlet box, comprising:
   a bracket for housing an electrical component, said bracket including a wall structure that defines a front opening and a side wall having a leveling structure for leveling the bracket relative to an electrical outlet box; and
   an adhering element attached to the wall of the bracket, with the leveling structure being coupled between the side wall of the bracket and a wall of an electrical outlet box, and the adhering element having a thickness configured to extend between the side wall and a wall of an electrical outlet box to adhere the bracket to an electrical outlet box.

2. The gangable electrical unit of claim 1, wherein the wall structure of the bracket includes the side wall, a top wall, a bottom wall, and an open back, with the adhering element being attached to the attachment side wall.

3. The gangable electrical unit of claim 1, wherein the wall structure of the bracket includes three walls that partially surround the front opening.

4. The gangable electrical unit of claim 1, wherein the adhering element is a double-sided adhesive tape.

5. The gangable electrical unit of claim 1, wherein the adhering element is an adhesive.

6. The gangable electrical unit of claim 1, wherein the adhering element is a putty.

7. The gangable electrical unit of claim 1, wherein the adhering element is a hook and loop tape.

8. A ganged electrical outlet box assembly comprising:
   the gangable electrical unit of claim 1;
   an electrical outlet box having a four-sided wall structure defining a front opening, said electrical outlet box wall structure having an outer periphery and an interior, said interior for receiving an electrical component, with the gangable electrical unit being attached to the electrical outlet box by the adhering element.

9. The ganged electrical outlet box assembly of claim 8, wherein the adhering element is a double-sided adhesive tape.

10. The ganged electrical outlet box assembly of claim 8, wherein the adhering element is an adhesive.

11. The ganged electrical outlet box assembly of claim 8, wherein the adhering element is a putty.

12. The ganged electrical outlet box assembly of claim 8, wherein the adhering element is a hook and loop tape.

13. An electrical unit for coupling to a stud or an electrical outlet box comprising:
   a bracket including a wall structure that defines a front opening;
   a first member coupled to the wall structure for mounting the wall structure to a stud or an electrical outlet box; and
   a second member coupled to the wall structure of the bracket along a weakened portion that is positioned between the second member and the wall structure, wherein the second member is configured to be broken away from the wall structure of the bracket with the application of a force sufficient to break the weakened portion.

14. The gangable electrical unit of claim 13, wherein the weakened portion includes a plurality of perforations.

15. A gangable electrical unit for positioning an electrical component beside an electrical outlet box comprising:
   a plastic bracket for housing an electrical component, said bracket including a front opening surrounded by a wall structure; and
   a non-permanent adhering element attached to the wall structure for coupling the bracket to a wall of an electrical outlet box, said adhering element being positioned on the bracket at a location that is spaced from a front opening of the electrical outlet box and being configured to engage a wall of an electrical outlet box in a rear section of the wall, wherein the rear section of the wall is about the rear half of the wall.

16. The gangable electrical unit of claim 15, wherein the adhering element is one of an adhesive, an adhesive tape, a putty, or a hook and loop tape.

* * * * *

UNITED STATES PATENT AND TRADEMARK OFFICE
CERTIFICATE OF CORRECTION

PATENT NO. : 6,872,884 B2
DATED : March 29, 2005
INVENTOR(S) : Roesch et al.

It is certified that error appears in the above-identified patent and that said Letters Patent is hereby corrected as shown below:

Column 9,
Line 12, before "wall" insert -- side --.
Line 22, delete "attachment".

Signed and Sealed this

Thirtieth Day of August, 2005

JON W. DUDAS
*Director of the United States Patent and Trademark Office*